(12) United States Patent
Chang et al.

(10) Patent No.: US 12,581,401 B2
(45) Date of Patent: Mar. 17, 2026

(54) PC5 BROADCAST MESSAGES WITH SELECTED SYSTEM INFORMATION

(71) Applicant: Kyocera Corporation, Kyoto (JP)

(72) Inventors: Henry Chang, San Diego, CA (US); Amit Kalhan, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 336 days.

(21) Appl. No.: 18/032,885

(22) PCT Filed: Oct. 18, 2021

(86) PCT No.: PCT/US2021/055397
§ 371 (c)(1),
(2) Date: Apr. 20, 2023

(87) PCT Pub. No.: WO2022/086847
PCT Pub. Date: Apr. 28, 2022

(65) Prior Publication Data
US 2023/0292234 A1      Sep. 14, 2023

Related U.S. Application Data

(60) Provisional application No. 63/104,390, filed on Oct. 22, 2020.

(51) Int. Cl.
*H04W 8/00* (2009.01)
*H04B 17/318* (2015.01)
(Continued)

(52) U.S. Cl.
CPC .......... *H04W 48/20* (2013.01); *H04B 17/328* (2023.05); *H04W 8/005* (2013.01); *H04W 48/16* (2013.01); *H04W 92/18* (2013.01)

(58) Field of Classification Search
CPC ..... H04W 48/20; H04W 8/005; H04W 48/16; H04W 92/18; H04W 48/12; H04W 88/04;
(Continued)

(56) References Cited

U.S. PATENT DOCUMENTS

| | | | |
|---|---|---|---|
| 10,383,035 B2 | 8/2019 | Sheng | |
| 2016/0337954 A1 | 11/2016 | Gulati et al. | |

(Continued)

FOREIGN PATENT DOCUMENTS

WO      WO-2021088093 A1 *      5/2021      ............ H04W 72/12

OTHER PUBLICATIONS

Oppo; "KI#3, New Sol: New solution for Layer-2 based UE-to-Network Relay discovery and selection based on PLMN selection," S2-2006557; SA WG2 Meeting #140E, Sep. 2, 2020.

(Continued)

*Primary Examiner* — Said M Elnoubi

(57) ABSTRACT

A relay user equipment (UE) device transmits selected system information in a sidelink discovery message where the selected system information is a subset of system information received from a cell at the relay UE device. A remote UE device receiving the sidelink discovery message with the selected system information obtains at least system information for accessing the cell where such system information may not be available directly from the cell. The remote UE receiving select system information from each of a plurality of candidate relay UE devices manages relay selection/reselection at least partially based on the selected system information.

24 Claims, 5 Drawing Sheets

(51) Int. Cl.
  H04W 48/16 (2009.01)
  H04W 48/20 (2009.01)
  H04W 92/18 (2009.01)
(58) Field of Classification Search
  CPC ..... H04W 40/12; H04W 40/22; H04W 40/24;
      H04W 76/14; H04B 17/328; Y02D 30/70
  See application file for complete search history.

(56) References Cited

U.S. PATENT DOCUMENTS

| 2018/0092027 A1* | 3/2018 | Sheng | .................... | H04W 48/08 |
| 2020/0008127 A1* | 1/2020 | Ohtsuji | .................... | H04W 4/70 |
| 2023/0122730 A1* | 4/2023 | Guo | ...................... | H04W 72/25 |
| | | | | 370/329 |

OTHER PUBLICATIONS

Huawei, Hisilicon, "KI#3, Sol#7: Update to resolve ENs," S2-2007214; SA WG2 Meeting #141E e-meeting; Oct. 2, 2020.
Oppo; "KI#3: Evaluation and conclusion for Layer-2 based UE-to-Network Relay (solution #7)," S2-2006963; SA WG2 Meeting #141E, Sep. 30, 2020.

* cited by examiner

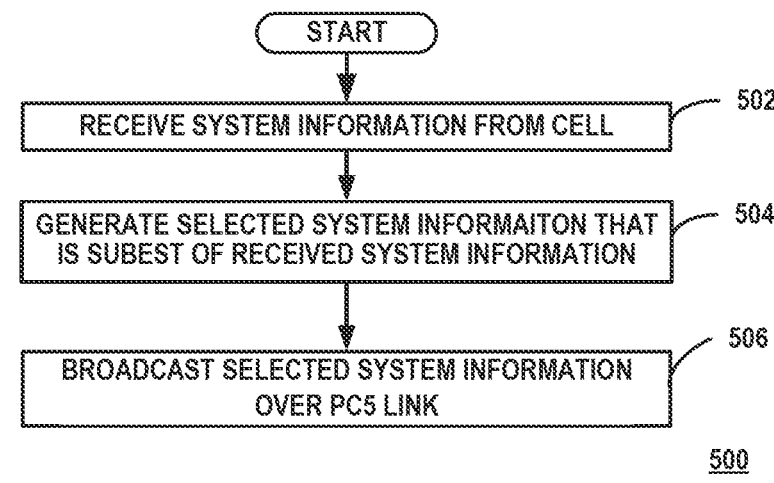

START

RECEIVE SYSTEM INFORMATION FROM CELL — 502

GENERATE SELECTED SYSTEM INFORMAITON THAT IS SUBEST OF RECEIVED SYSTEM INFORMATION — 504

BROADCAST SELECTED SYSTEM INFORMATION OVER PC5 LINK — 506

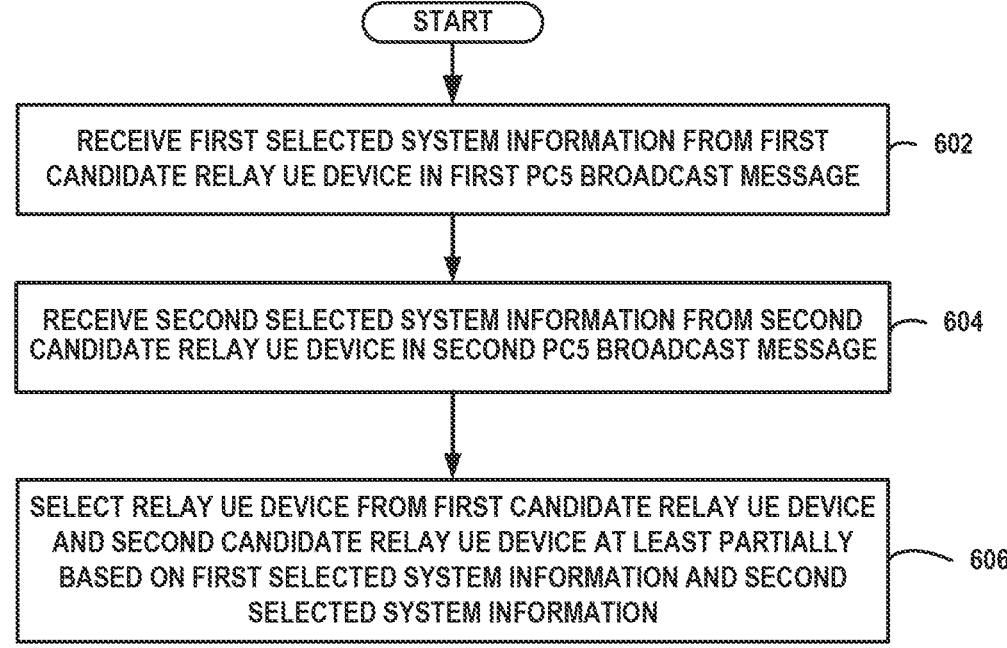

START

RECEIVE FIRST SELECTED SYSTEM INFORMATION FROM FIRST CANDIDATE RELAY UE DEVICE IN FIRST PC5 BROADCAST MESSAGE — 602

RECEIVE SECOND SELECTED SYSTEM INFORMATION FROM SECOND CANDIDATE RELAY UE DEVICE IN SECOND PC5 BROADCAST MESSAGE — 604

SELECT RELAY UE DEVICE FROM FIRST CANDIDATE RELAY UE DEVICE AND SECOND CANDIDATE RELAY UE DEVICE AT LEAST PARTIALLY BASED ON FIRST SELECTED SYSTEM INFORMATION AND SECOND SELECTED SYSTEM INFORMATION — 606

PC5 BROADCAST MESSAGES WITH SELECTED SYSTEM INFORMATION

CLAIM OF PRIORITY

The present application claims the benefit of priority to Provisional Application No. 63/104,390 entitled "Sidelink relay reselection based on discovery announcements", filed Oct. 22, 2020, assigned to the assignee hereof and hereby expressly incorporated by reference in its entirety.

CROSS REFERENCE TO RELATED APPLICATIONS

This application is related to U.S. application Ser. No. 18/032,908, which is a national stage application of PCT/US2021/055403, entitled "RELAY SELECTION AND RESELECTION BASED ON DISCOVERY MESSAGE TRANSMISSION RESOURCES", filed concurrently with this application and incorporated by reference in its entirety herein.

FIELD

This invention generally relates to wireless communications and more particularly to wireless communication links using relay devices.

BACKGROUND

Many wireless communication systems that employ several base stations that provide wireless service to user equipment (UE) devices enable sidelink communication between two or more UE devices where the UE devices can communicate directly with other UE devices. With sidelink communication, UE devices transmit data signals to each other over a direct link using the cellular resources instead of through a base station such Proximity Services (ProSe) communication is sometimes also referred to as device-to-device (D2D). In addition, one or more UE devices can be used as relay devices between a UE device and a communication device where the relay device forwards data between a UE device and a communication device. The communication device may be a base station or a destination UE device. In some situations, for example, the UE device may be out of the service area of the base station and the relay UE device provides a communication link routed from such an out-of-coverage (OoC) UE device through a relay UE device to the base station.

SUMMARY

A relay user equipment (UE) device transmits selected system information in a PC5 broadcast message, such as a sidelink discovery message, where the selected system information is a subset of system information received from a cell at the relay UE device. A remote UE device receiving the PC5 broadcast message with the selected system information obtains at least system information for accessing the cell where such system information may not be available directly from the cell. The remote UE receiving select system information from each of a plurality of candidate relay UE devices manages relay selection/reselection at least partially based on the selected system information.

BRIEF DESCRIPTION OF THE DRAWINGS

FIG. 5 is a flow chart of an example of a method for conveying selected system information to a remote UE device.

FIG. 6 is a flow chart of an example of a method of relay reselection based on selected system information received from candidate relay UE devices.

DETAILED DESCRIPTION

Figure 1A:
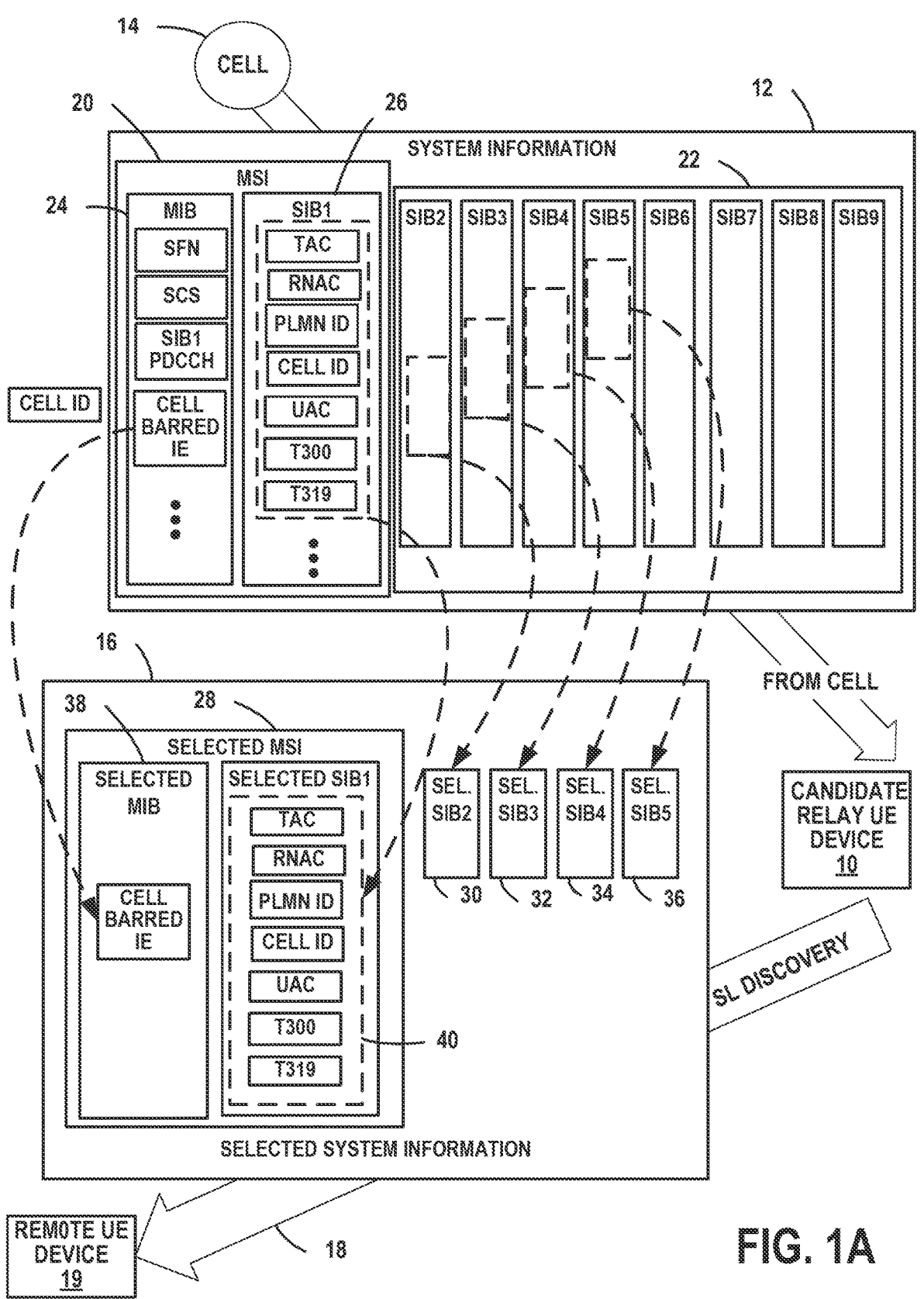
FIG. 1A is a block diagram for an example where a candidate relay user equipment (UE) device receives system information from a cell provided by a base station (gNB) and transmits selected system information in a sidelink discovery message.

As discussed above, a relay UE device provides connectivity between a remote UE device and a communication device which can be another UE device (destination UE device) or a base station (gNB). The relayed connection between a remote UE device and destination UE device is sometimes referred to as a UE to UE (U2U) relay connection. The relayed connection between a remote UE device and a base station (gNB) is sometimes referred to as a UE to network (U2N) relay connection. In conventional systems where the communication device is a base station (gNB), the relay UE device is required to meet certain criteria to function as a relay. For example, the relay UE device must be in coverage and have a cellular (Uu) communication link to the base station of sufficient quality in order to be available for relaying functions. For U2N relaying, therefore all candidate relay devices are assumed to be within coverage of the base station (gNB). Any relay UE that does not meet the suitability criteria, which is based on satisfying the Uu RSRP threshold requirements, will not be a candidate relay UE device and will not send discovery messages indicating the UE device can support relay functionality. The remote UE device, which may be OoC in many situations, connects to the relay UE device over a sidelink (PC5) communication link. Since either or both the remote UE device and the relay UE device may be moving, the quality of the PC5 link and/or the quality of cellular Uu link may degrade. A link failure of either link will prompt the remote UE device to search for another relay UE device. In at least some conventional systems, the gNB configures or preconfigures the remote UE device with a PC5 quality threshold (e.g., minimum sidelink RSRP (SL-RSRP threshold) or sidelink discovery RSRP (SD-RSRP) threshold) which triggers the remote UE device to begin the relay reselection procedure. Accordingly, when the quality of the PC5 connection to the relay UE device drops below the threshold, the remote UE device searches through candidate relay devices to select another relay UE device with a higher quality sidelink connection. In some relaying situations, a remote UE device is connected to a gNB through a relay UE device that is within coverage of the gNB and is RRC Connected to the gNB. Where the remote UE is within coverage, the remote UE can obtain system information (SI) directly from the gNB. The remote UE device, for example, is capable of receiving System Information Blocks (SIBs) transmitted by the gNB. The remote UE device typically cannot receive system information directly from the gNB where the remote UE device is out-of-coverage (OoC) even though the remote UE is RRC Connected to the gNB. As a result, there is no way, in conventional systems, for the gNB to control the remote UE device while it is not yet connected to the relay UE device. In particular, it may be advantageous for the gNB to control access of particular UE devices to the network, which is typically controlled via system information, and since it is up to the remote UE device to determine whether it is allowed to access the network, the remote UE device needs updated system information to determine whether it is allowed to access the network. Although the remote UE device has the option to use the pre-configured control information to perform relay reselection, the pre-configured control information cannot be updated dynamically by the gNB. More specifically, the OoC remote UE device is not made aware of changes in the gNB system information associated with accessing the gNB. Further, the discovery procedure is intended to work among different Public Land Mobile Networks (PLMNs) and the pre-configured control from one PLMN may differ from that of another PLMN. In particular, frequency priority may differ from one PLMN to another. As a result, the OoC remote UE device may not have the frequency priority of a gNB in a particular PLMN where the remote UE device is attempting to connect to the gNB. In addition, when the remote UE device is selecting/reselecting a relay UE device, it is often useful for the remote UE device to consider the system information associated with the gNBs serving the candidate relay UE devices. Accordingly, there is a need for providing an OoC remote UE device with current system information of the gNB serving a relay UE device.

Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (Rel-17).

FIG. 1A is a block diagram for an example where a candidate relay UE device 10 receives system information 12 from a cell 14 provided by a base station (gNB) and transmits selected system information 16 in a sidelink discovery message 18. For the examples discussed herein, the selected system information 16 is transmitted in a sidelink discovery message 18. In some situations, however, other PC5 broadcast signals can be used to provide the selected system information 16 to one or more remote UE devices 19. The system information 12 includes information in accordance with conventional systems and typically includes at least Minimum System Information 20 and often includes Other System Information (OSI) 22. MSI 20 includes a Master Information Block (MIB) 24 in an MIB message broadcasted on the Physical Broadcast Channel (PBCH) and a System Information Block 1 (SIB1) 26 sent in a SIB message on the Physical Downlink Shared Channel (PDSCH) through the Radio Resource Control (RRC) layer. Therefore, although the system information 12 is illustrated as single block being transmitted to the candidate relay UE device 10, the information is conveyed over different channels. The OSI may include SIB2, SIB3, SIB4, SIB5, SIB6, SIB7, SIB8 and SIB9 as well as others, such as SIB 12 in some situations. The 5G specification specifies the information contained in the MIB and each of the several SIB messages.

The MIB 24 provides the System Frame Number (SFN), the Subcarrier Spacing (SCS), the SIB1 PDCCH resource, and the cell barred information (cellBarred IE). SIB1 26 includes Cell Selection Information, the Public Land Mobile Network ID (PLMN ID), Tracking Area Code (TAC), Cell Identity (Cell ID), RAN Notification Information, SI scheduling info for OSI, and Serving Cell Information. SIB2 includes cell re-selection information common for intra-frequency, inter-frequency and/or inter-RAT re-selection. SIB3 includes intra-frequency cell re-selection information such as PCI, q-Offset, q-RxLev, q-Qual, and Black cell list. SIB4 includes Inter frequency cell re-selection information such as New Radio Absolute Radio-Frequency Channel Number (NR-ARFCN). SIB5 includes inter-system cell re-selection toward LTE such as EARFCN. SIB6 includes Earth quake and Tsunami Warning System primary notifications. SIB7 includes Earth quake and Tsunami Warning System secondary notifications. SIB8 includes Commercial Mobile Alert services (CMAS) notifications. SIB9 includes timing information for UTC, GPS and local time. In some situations, SIB 12 may be sent which at least includes the sl-TxPoolSelectedNormal IE that provides information regarding the shared resource pool for discovery and traffic.

For the example of FIG. 1A, the candidate relay UE device 10 processes the first system information for the cell 14 to generate the selected system information 16 which is a subset of the system information 12. The selected system information 16 includes at least selected MSI 28 which is a subset of the MSI 20. In some situations, the selected system information may include portions (subsets) of other system information. For the examples, the selected system information 16 may include selected SIB2 30, selected SIB3 32, selected SIB4 34, and selected SIB5 36, which are subsets of the relay-received SIB2, SIB3, SIB4 and SIB5, respectively.

For the examples herein, the selected MSI 28 includes remote UE cell access information 38 for accessing the cell 14 where the remote UE cell access information 38 may include the cell barred information (cellBarred IE), UAC configuration, PLMN ID, TAC, RAN based Notification Area Code (RNAC), Cell ID, T300 timer, and T319 timer. The TAC is for tracking area update when a UE device is in RRC IDLE state. The RNAC tracking area update when the UE is in RRC INACTIVE state. The T300 timer is used for establishing connection to the cell when the UE device is initially in IDLE state and is started upon sending a RRC Setup Request. The T319 timer is used for resuming a connection to the cell when the UE is initially in INACTIVE state and is started upon transmission of a RRC Resume Request. For the examples herein, the selected MSI 28 includes selected MBI 38 and selected SIB1 40. The selected MBI 38 includes the cellBarred IE from the MBI 24 which indicated whether the cell is barred, regardless of the UE type of UE category. For the examples, the selected SIB1 40 includes UAC information, T300 timer, T319 timer, PLMN ID, Cell ID, TAC, and RNAC. The T300 timer, T319 timer and the UAC information, such as uac-BarringInfo IE, are sent in the ue-TimersAndConstants IE. The CellAccessRelatedInfo IE includes the PLMN-IdentityInfo IE which includes PLMN ID, Cell ID, TAC, and RNAC.

Figure 1B:
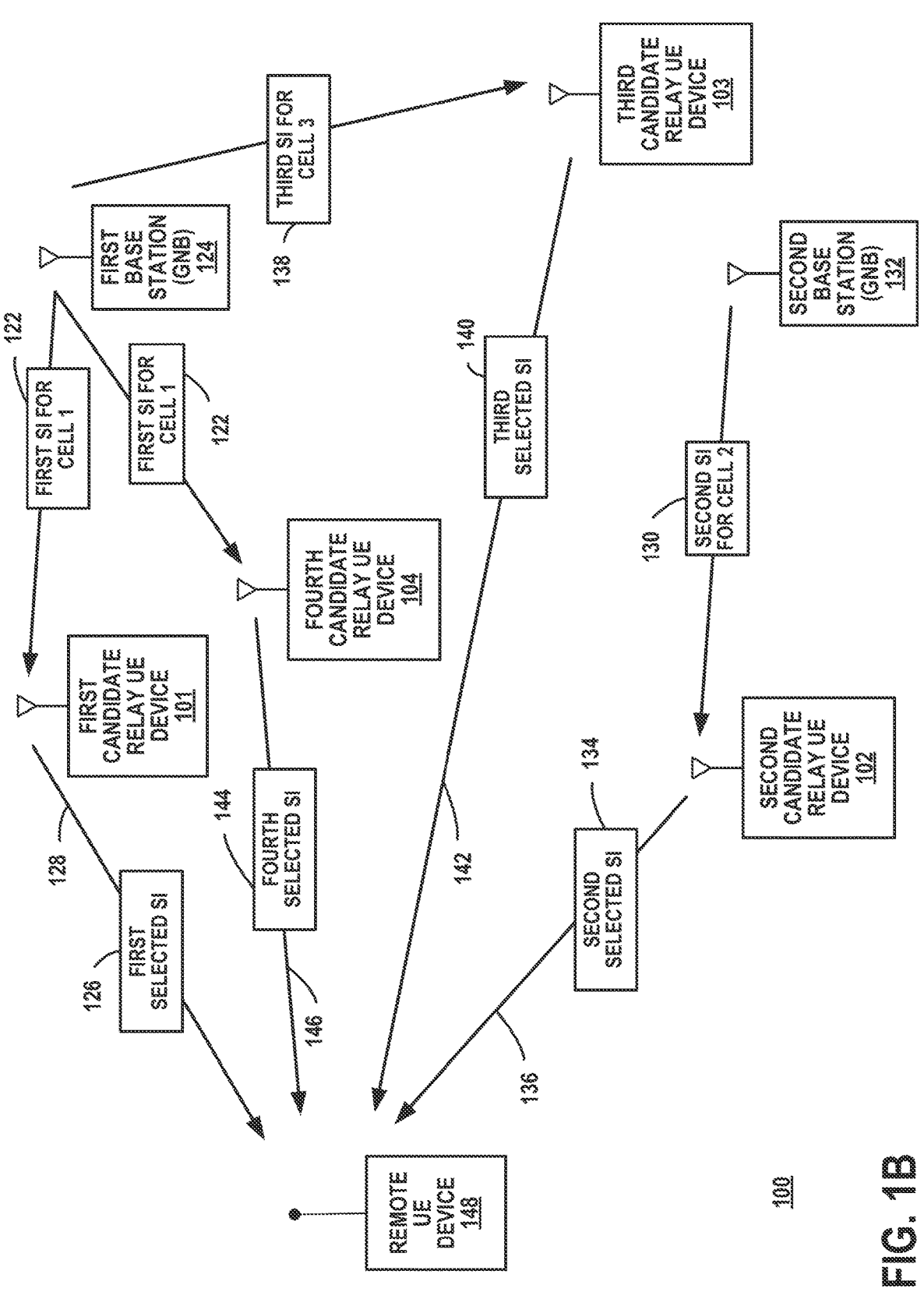
FIG. 1B is a block diagram of an example of a communication system where a plurality of candidate relay UE devices transmits selected system information in sidelink discovery messages where each selected system information is a subset of system information received from the serving cell of the candidate relay UE device.

FIG. 1B is a block diagram of an example of a communication system 100 where a plurality of candidate relay UE devices 101-104 transmit selected system information 106, 108, 110, 112 in sidelink discovery messages 114, 116, 118, 120 where each selected system information 106, 108, 110, 112 is a subset of system information received from the serving cell of the candidate relay UE device. Accordingly, the system 100 of FIG. 1B is an example where multiple relay candidate UE devices include selected system information in sidelink discovery messages that are received by a remote UE device in accordance with the example of FIG. 1A. As discussed above, other PC5 broadcast signals can be used to provide the selected system information to one or more remote UE devices. Accordingly, one or more of the transmitted signals in FIG. 1B that include selected system information may be PC5 broadcast signals other than sidelink discovery signals. For the example, the UE devices may be any type of device that can receive signals from, and transmit signals to, base stations (gNBs) and other UE devices. The UE devices operate in a communication system that includes a plurality of base stations that each provide wireless service within a service area. Each base station provides wireless service within one or more cells. System information may be different between cells of the same gNB. Accordingly, for the example of FIG. 1A, each system information is associated with a unique cell where one or more cells are provided by a gNB. In the interest of identification and clarity, the terms "first", "second", "third" and "fourth" are used to label devices, equipment, and signals discussed with reference to FIG. 1B. These terms are not intended to imply any preference or chronological order of the labeled items. Accordingly, the terms may be applied in a different manner without changing the description.

The examples discussed herein operate in accordance with many of the assumptions and characteristics of conventional UE-to-Network (U2N) relaying conventions. The discussed techniques, however, may be applied in other systems where one or more of the assumptions and characteristics may differ. As is known, U2N relaying was first specified in Rel-13 and further studied in Rel-15 where the legacy U2N relaying mechanism was considered as baseline. Systems operating in accordance with these standards operate in accordance with several characteristics. A ProSe U2N relay device is always in-coverage of the network. A ProSe U2N relay device performing sidelink communication for ProSe UE-to-Network Relay operation is in the RRC_CONNECTED state. The base station (gNB) controls whether a UE device can act as a ProSe U2N relay device. The gNB may provide transmission resources for ProSe U2N relay discovery using broadcast signaling for RRC_IDLE state, RRC_INACTIVE state and dedicated signaling for RRC_CONNECTED state. The gNB may provide reception resources for ProSe U2N relay discovery using broadcast signaling. The gNB may broadcasts a minimum and/or a maximum Uu link quality (RSRP) threshold(s) that the ProSe U2N relay device needs to satisfy before it can initiate a U2N relay discovery procedure. The remote UE device can transmit ProSe U2N relay discovery solicitation messages while in all RRC states depending on the configuration of resources for ProSe U2N relay discovery. The remote UE device performs radio measurements at the PC5 interface and uses the measurements for ProSe U2N relay selection and reselection along with higher layer criterion. Although not currently required by a NR communication specification, the remote UE device typically selects the ProSe U2N relay device, which satisfies higher layer criterion and has the best PC5 link quality among all suitable candidate ProSe U2N relays. Currently, for NR sidelink-based relay, a single-hop relay is considered, but extension to multi-hop relaying may also be supported.

For the example of FIG. 1B, the first candidate relay UE device 101 receives first system information 122 for a cell (Cell 1) from a gNB (base station) 124. The first candidate relay UE device 101 processes the first system information 122 as discussed above with reference to FIG. 1A to generate first selected system information 126. The first candidate relay UE device 101 transmits the first selected system information 126 in a first sidelink discovery message 128. The sidelink discovery messages discussed with reference to FIG. 1B are transmitted in accordance with either the Model A discovery procedure or the Model B discovery procedure. With Model A, the relay UE devices periodically broadcast announcement messages to indicate their presence and provided connectivity services. With Model B, the procedure is initiated by a remote UE device, which broadcasts solicitation messages with the desired connectivity service. A relay UE device that can provide the solicited service sends a response message. Accordingly, the sidelink discovery messages may be the initial transmission of the discovery procedure or may be a response to the initial transmission of a remote UE device. However, the sidelink discovery message is the initial transmission of the discovery procedure that is from the relay UE device to a particular remote UE device with both discovery procedures.

Continuing with the example of FIG. 1B, the second candidate relay UE device 102 receives second system information 130 for a cell (Cell 2) from a gNB (base station) 132. The second candidate relay UE device 102 processes the second system information 130 as discussed above with reference to FIG. 1A to generate second selected system information 134. The second candidate relay UE device 102 transmits the second selected system information 134 in a second sidelink discovery message 136.

The third candidate relay UE device 103 receives third system information 138 for a cell (Cell 3) from a gNB (base station) 124. For the example, therefore, the first gNB 124 provides at least two cells including Cell 1 and Cell 3. The third candidate relay UE device 103 processes the third system information 138 as discussed above with reference to FIG. 1A to generate third selected system information 140. The third candidate relay UE device 103 transmits the second selected system information 140 in a third sidelink discovery message 142.

Continuing with the example of FIG. 1B, the fourth candidate relay UE device 104 receives first system information 122 for the cell (Cell 1) from the gNB (base station) 124. Accordingly, for the example, both the first candidate relay UE device 101 and the fourth candidate relay UE device 104 are served by the same cell (Cell 1) and, therefore, receive the same system information 122. The fourth candidate relay UE device 104 processes the first system information 122 as discussed above with reference to FIG. 1A to generate fourth selected system information 144. For the example, the first selected system information 126 and the fourth selected system information 144 are the same. The first selected system information 126 may be different from the fourth selected system information 144 in some situations where, for example, one candidate relay UE device includes additional selected system information. The fourth candidate relay UE device 104 transmits the first selected system information 144 in a first sidelink discovery message 146.

Accordingly, for the example, a remote UE device 148 receives four sidelink discovery signals 128, 136, 142, 146 either through the Model A or Model B procedures. The remote UE device 148 evaluates the selected system information 126, 134, 140, 144 received in the four discovery signals. The number of received sidelink discovery signals may be different in other situations where the number depends on the number of candidate relay UE devices in the area and the services they can provide. The remote UE device 148 performs relay selection/reselection at least partially based on the selected system information. In some situations, for example, the remote UE device 148 may determine that a particular candidate relay UE device should not be selected because the selected system information indicates that the serving gNB cannot support the services required by the remote UE device 148. In another case, the remote UE device determines that the selected system information indicates that the remote UE device is prohibited from accessing the cell. For the example, the relay selection/reselection is in accordance with conventional techniques that are based on criteria other than system information. For example, in the situation where two relay UE devices are served by the same cell, the remote UE device may prefer to select the relay UE device that includes a higher quality PC5 connection.

Typically, the cell also configures the frequency priority for IDLE/INACTIVE UE devices to establish which frequencies are used first when the IDLE/INACTIVE UE devices try to access the cell. Such configuration may be advantageous in managing congestion control and load balancing among frequency channels at the NW, for example. The frequency priority is broadcasted in SIB4 with at least two pertinent IEs including the cellReselectionPriority IE and the cellReselectionSubPriority IE. The cellReselectionPriority is a mandatory field and provides the absolute priority of concerned carrier frequency and is used in the cell reselection procedure. The highest priority value is 7 and lowest priority value is 0. The cellReselectionSubPriority is an optional field and a parameter indicates a fractional value to be added to the value of cellReselectionPriority to obtain the absolute priority of concerned carrier frequency for E-UTRA and NR. Value oDot2 corresponds to 0.2, value oDot4 corresponds to 0.4 and so on. The Absolute priority is the combination of cellReselectionPriority and CellReselectionSubPriority (if configured).

Frequency priority not only impacts the relay UE device which is connected to the cell in the Uu link, but can also influence the operation of a remote UE. If the relay UE device only serves as a relay to the remote UE device, the access of the remote UE device to the network impacts the resource usage of the network. In one example, therefore, the remote UE device should preferably connect to the cell using the highest priority frequency that is available. If there are two relay UE devices connected to the gNB where one is on a first frequency (F1) and the other is on a second frequency (F2) having higher priority than F1, the remote UE device selects the relay UE device using F2.

In some examples, therefore, the selected system information includes frequency priority IEs from SIB4. Furthermore, the relay UE device also indicates to the remote UE device frequency of the Uu link on which the relay UE deice is camped. In one technique, the relay UE device indicates the frequency the remote UE device sends the selected system information including the selected SIB4 IEs. With another technique, the relay UE device only indicates it is camped on a frequency when it is not the highest priority frequency based on SIB4.

After selecting a relay UE device, the remote UE device 148 uses the selected system information provided by the selected relay UE device to establish the U2N connection to the serving cell through the selected relay UE device. Therefore, the remote UE device uses the current system information for the cell instead of preconfigured system information. This provides a mechanism for the gNBs to more efficiently manage access to the network. Since system information can be dynamically configured, the cell expects all the UE devices that access the cell to operate according to the latest system information.

As discussed below, the selected system information further may include discovery resource pool information associating sidelink discovery resources with Uu Reference Signals Received Power (RSRP) levels. In accordance with conventional systems, candidate relay UE devices transmit sidelink discovery messages using resources that are allocated for UE devices measuring a Uu RSRP within a particular RSRP range. In other words, a UE device transmits sidelink discovery messages using a communication resource from the pool of discovery resources associated with the measured Uu RSRP. For some examples herein, the remote UE device performs relay reselection at least partially based on the communication resources used to transmit sidelink discovery signals. The sidelink discovery communication resource of a received sidelink discovery message reveals the quality of the Uu link between the relay UE device transmitting the discover message and the serving cell. The remote UE device selects a relay UE device partially based on the Uu link. For example, the remote UE device may select the relay UE device with a higher quality Uu link from two candidate relay UE devices with similar PC5 link quality levels.

In some situations, the discovery pool information is provided to the relay UE device by providing a shared discovery pool where discovery pool and traffic pool information is conveyed by the gNB to relay UE device. In accordance with current standards, the shared pool for discovery and traffic is provided under SIB12 using the sl-TxPoolSelectedNormal IE. In some situations, therefore, the selected system information includes selected shared pool information received in SIB12. Where there is dedicated discovery pool, the discovery pool information may be provided in a SIB and the relay UE device selects the discovery pool information and provides it as part of the selected system information. Current standards to not specify the particular SIB for conveying dedicated discovery pool information. The discovery pool information may be conveyed to the relay UE device using dedicated signaling.

Figure 2:
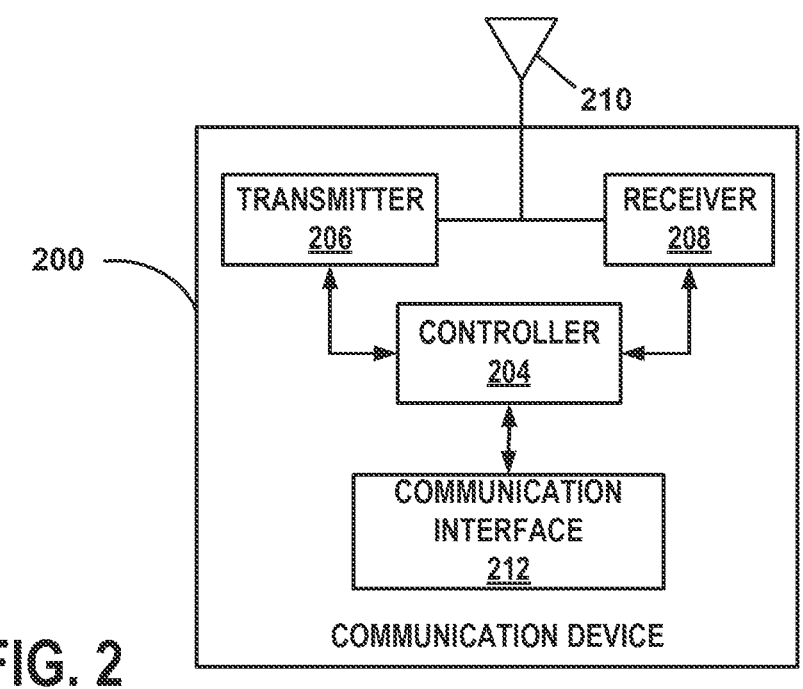
FIG. 2 is a block diagram of an example of a base station.

FIG. 2 is a block diagram of an example of a base station 200 suitable for use as both the base stations 124, 132 and any base station serving any of the UE devices. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 40, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
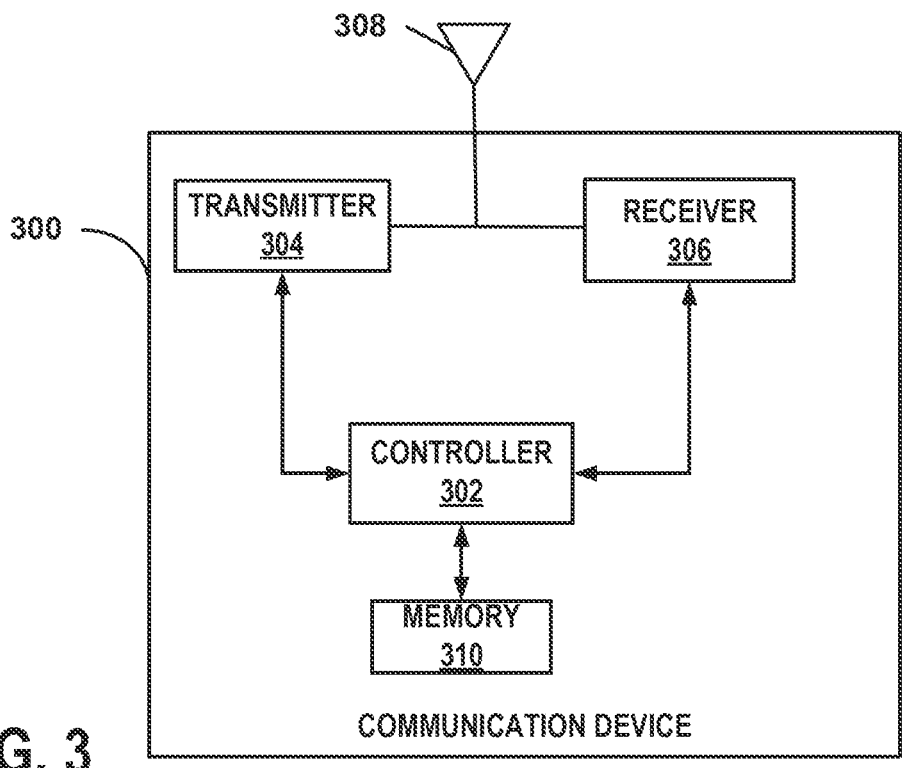
FIG. 3 is a block diagram of an example of a UE device suitable for use as each of the UE devices.

FIG. 3 is a block diagram of an example of a UE device 300 suitable for use as each of the UE devices 10, 19, 101-104, 148. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
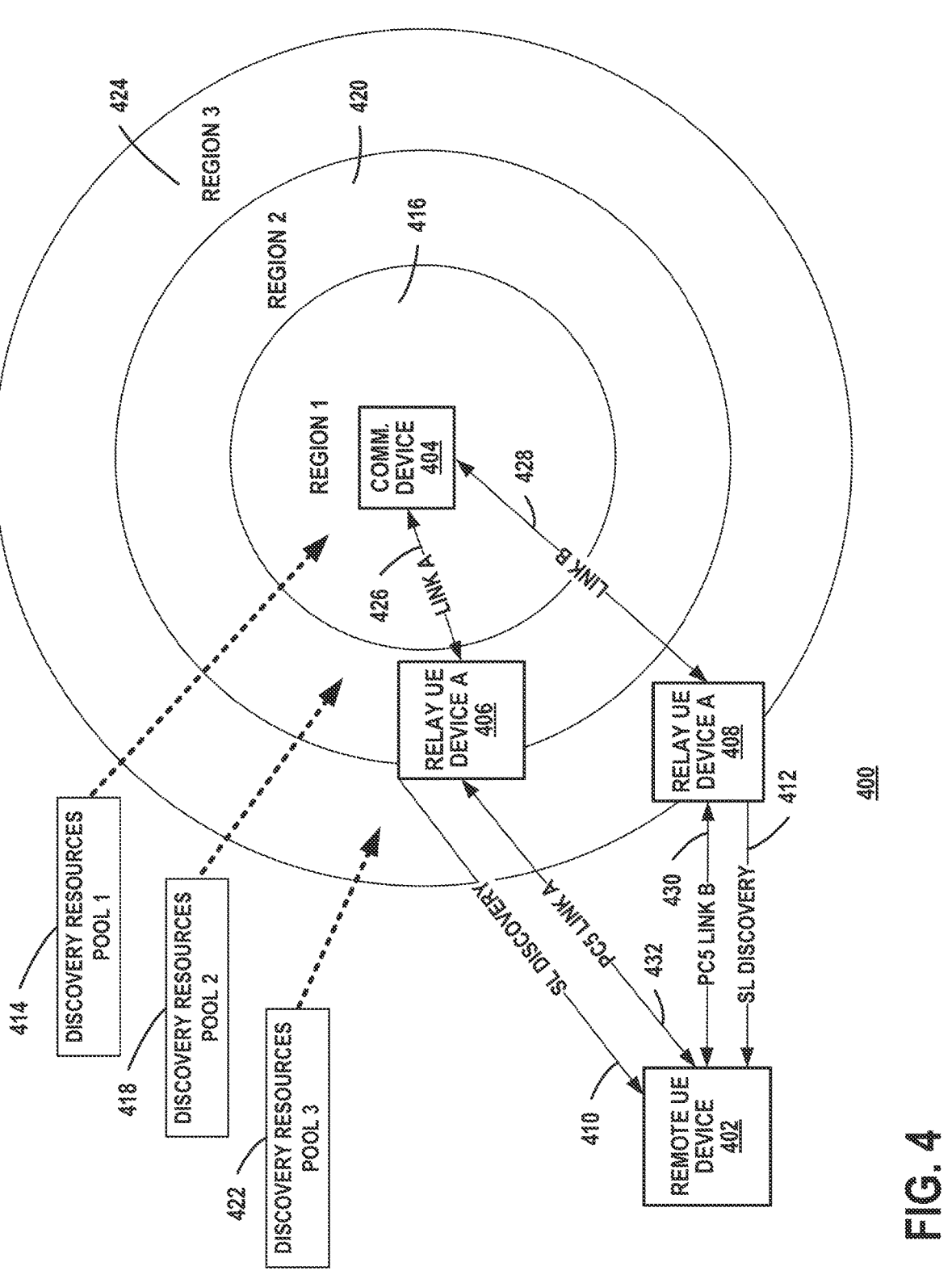
FIG. 4 is a block diagram of a communication system for an example where a remote UE device selects a relay UE device based on discovery pool resources allocated based on link quality to a target communication device.

FIG. 4 is a block diagram of a communication system 400 for an example where a remote UE device 402 selects a relay UE device based on discovery pool resources allocated based on link quality to a target communication device 404. For the example, the target communication device may be a base station (gNB) or another UE device and the quality is determined based on RSRP. The link between the relay EU device and the target communication device 404 is a Uu link where the target device 404 is a gNB. The link between the relay UE device and the target communication device 404 is a PC5 link in the examples where the target device 404 is a target UE device. The remote UE device 402 is establishing, or maintaining, a relayed communication link to the target communication device 404 and is selecting/resecting a relay UE device from a plurality of candidate relay UE devices 406, 408. Each candidate relay UE device 406, 408 transmits a sidelink discovery message 410, 412 using a discovery communication resource where the discovery communication resources are allocated based on the RSRP level of the link to the target communication device 402. For the example, the discovery pool resources are allocated for three regions where a discovery resources pool 1 414 is associated with region 1 416, discovery resources pool 2 418 is associated with second region 420, and discovery resources pool 3 422 is associated with a third region 424. Each of the discovery resource pools has at least one communication resource allocated for transmission of sidelink discovery messages. The discovery resources pool 1 414 is allocated for communication links having a quality greater than a first threshold. For the example, if a candidate relay UE device measures an RSRP of the link to the target communication device that is higher than a first RSRP threshold, the candidate relay UE device uses a communication resource from pool 1 414 to transmit a sidelink discovery message. The discovery resources pool 2 418 is allocated for communication links having a quality between a first threshold and second threshold. For the example, if a candidate relay UE device measures an RSRP of the link to the target communication device to be between the first threshold and the second threshold, the candidate relay UE device uses a communication resource from pool 2 418 to transmit a sidelink discovery message. The discovery resources pool 3 422 is allocated for communication links having a quality between the second threshold and a third threshold. For the example, if a candidate relay UE device measures an RSRP of the link to the target communication device to be between the second threshold and the third threshold, the candidate relay UE device uses a communication resource from Pool 3 422 to transmit a sidelink discovery message.

The discovery resources pool information defining the allocation of resources to the discovery resources pools is managed by the network. For the examples herein, the discovery resources pool information is communicated to the relay UE device through a SIB where the Uu RSRP thresholds are defined for each discovery pool resource.

Continuing with the example of FIG. 4, remote UE device 404 receives a sidelink discovery message 410 from the relay UE device A 406 and determines the communication resources used to transmit the sidelink discovery message 410. The remote UE device 402 also receives a sidelink discovery message 412 from the relay UE device B 408 and determines the communication resources used to transmit the sidelink discovery message 412. The remote UE device 402 determines the region where each candidate relay UE device is located. Based on the discovery communication resources used for the discovery message, the remote UE device determines at least a range of the quality of the link between each relay UE device and the target communication device 404. For example, the resource used for the SL discovery signal 410 indicates a range of values that includes the RSRP of Link A 426 as measured by the relay UE device 406. The resource used for the SL discovery signal 412 indicates a range of values that includes the RSRP of Link B 428 as measured by the relay UE device 406. The remote communication device 402 than evaluates the relay communication path through each of the relay UE devices 406, 406 to select/reselect a UE relay device two paths. The selected relay UE device may not be the relay UE device with the highest quality link to the target communication device since other factors may be considered. For example, relay UE device B 408 may be preferred to relay UE device A 406 where the PC5 link B 430 provides a much better overall path as compared to the relay UE device A 406 because of a lower quality of the PC5 Link A 432.

FIG. 5 is a flow chart of an example of a method for conveying selected system information to a remote UE device. The example is performed by a relay UE device and can therefore be performed by one of the relay UE devices 10, 101-104, 300, 406, 408 discussed above.

At step 502, system information is received from a cell. In accordance with known techniques, a gNB providing a cell to the relay UE device transmits system information. As discussed above, the system information includes MSI and may include OSI.

At step 504, selected system information is generated from the received system information. The relay UE device selects system information that is useful to a remote UE device to generate selected system information which is portion or subset of the system formation. For at least some examples, the selected system information includes at least a subset of MSI. The selected system information may also include subsets of information of other SIBs received from the cell.

At step 506, the selected system information is broadcast to at least one remote UE device over a PC5 link. For the example, the relay UE device transmits the selected system information in a sidelink discovery message which may be in accordance with either Model A or Model B discovery procedures.

FIG. 6 is a flow chart of an example of a method of relay reselection based on selected system information received from candidate relay UE devices. The method is performed by a remote UE device that is selecting or reselecting a relay UE device to maintain or establish a U2N relay connection. Accordingly, the method may be performed any of the remote UE devices 19, 148, 300, 402 discussed above.

At step 602, first selected system information is received from a first candidate relay UE device in a first PC5 broadcast message. For the example, the PC5 broadcast message is a sidelink discovery message. The first selected system information is a subset of the system information received by the first candidate relay UE device from its serving cell.

At step 604, second selected system information is received from a second candidate relay UE device in a second PC5 broadcast message. For the example, the PC5 broadcast message is a sidelink discovery message. The second selected system information is a subset of the system information received by the second candidate relay UE device from its serving cell.

At step 606, a relay UE device is selected from the first candidate relay UE device and the second candidate relay UE device at least partially based on the selected system information received from each candidate. The remote UE device may evaluate any of several parameters to determine which relay UE device should be selected. Examples of criteria include information related to cell barring, provided services, and frequency reselection. The criteria may also be based on other information. For example, discovery signal resources may be used to determine the RSRP levels of the Uu link of each candidate relay UE device to its serving cell allowing the remote UE device to take into account the Uu link quality of each candidate when selecting a relay UE device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A remote user equipment (UE) device comprising:
   a receiver configured to receive a first PC5 broadcast message and a second PC5 broadcast message, the first PC5 broadcast message transmitted from a first candidate relay UE and comprising first selected system information that is a portion of first relay-received system information received at the first candidate relay UE from a first cell, the second PC5 broadcast message transmitted from a second candidate relay UE and comprising second selected system information that is a portion of second relay-received system information received at the second candidate relay UE from a second cell, wherein at least one of the first selected system information and the second selected system information comprises discovery resource pool information associating sidelink discovery resources with Uu Reference Signals Received Power (RSRP) level; and a controller configured to select, from the first candidate relay UE and the second candidate relay and at least partially based on the first selected system information and the second selected system information, a relay UE for UE-to-Network (U2N) communication.

2. The remote UE device of claim 1, wherein the first PC5 broadcast message is a first sidelink discovery message and the second PC5 broadcast message is a second sidelink discovery message.

3. The remote UE device of claim 2, wherein the first selected system information is remote UE cell access information for accessing the first cell and the second selected system information is remote UE cell access information for accessing the second cell.

4. The remote UE device of claim 3, wherein:

the first selected system information comprises first selected Minimum System Information (MSI) that is a portion of MSI transmitted by the first cell and the second selected system information comprises second selected MSI that is a portion of MSI transmitted by the second cell.

5. The remote UE device of claim 4, wherein:

the first selected MSI comprises a first selected Master Information Block (MIB) that is a portion of an MIB transmitted by the first cell and the second selected MSI comprises a second selected MIB that is a portion of an MIB transmitted by the second cell.

6. The remote UE device of claim 3, wherein:

the first selected system information comprises a first selected System Information Block (SIB) that is a portion of an SIB transmitted by the first cell and the second selected system information comprises a second selected SIB which is a portion of an SIB transmitted by the second cell.

7. The remote UE device of claim 6, wherein:

the SIB transmitted by the first cell is one of SIB1, SIB3, SIB4 and SIB5 and the SIB transmitted by the second cell is one of SIB1, SIB3, SIB4 and SIB5.

8. The remote UE device of claim 4, wherein the first selected system information comprises at least one of Unified Access Control (UAC) configuration, Public Land Mobile Network Identifier (PLMN ID), Tracking Area Code (TAC), Radio Access Network Notification Area Code (RNAC), cell Identifier (cell ID), RRCSetupRequest timer (T300), RRCResumeRequest timer (T319) for the first cell and the second selected system information comprises at least one of UAC configuration, PLMN ID, TAC, RNAC, cell ID, T300, T319 for the second cell.

9. The remote UE device of claim 1, wherein the first selected system information comprises neighbor frequency information indicating operating frequencies of first neighbor cells in proximity of the first cell and the second selected system information comprises neighbor frequency information indicating operating frequencies of second neighbor cells in proximity of the second cell.

10. The remote UE device of claim 9, wherein the first selected system information comprises first frequency priority information for cell reselection for the first cell and the second selected system information comprises second frequency priority information for cell reselection for the second cell.

11. The remote UE device of claim 10, wherein the first selected system information comprises a first cell frequency of the Uu link to the first cell on which the first candidate relay UE device is camped and the second selected system information comprises a second cell frequency of the Uu link to the second cell on which the second candidate relay UE device is camped.

12. The remote UE device of claim 2, wherein the first sidelink discovery message is an initial relay-to-UE discovery transmission of one of a Model A discovery procedure and a Model B discovery procedure between the remote UE device and the first candidate relay UE and wherein the second sidelink discovery message is an initial relay-to-UE transmission of one of a Model A discovery procedure and a Model B discovery procedure between the remote UE device and the second candidate relay UE.

13. The remote UE device of claim 1, wherein the controller is configured to:

determine a first Uu RSRP of the first candidate relay UE based on a first transmission resource of the first sidelink discovery message;

determine a second Uu RSRP of the second candidate relay UE based on a second transmission resource of the second sidelink discovery message; and select, from the first candidate relay UE and the second candidate relay UE at least partially based on the first Uu RSRP, the second Uu RSRP, the first selected system information and the second selected system information, a relay UE for UE-to-Network (U2N) communication.

14. A candidate relay user equipment (UE) device comprising:

a receiver configured to receive system information from a cell;

a controller configured to process the system information, to generate selected system information that is a portion of the system information; and a transmitter configured to transmit a PC5 broadcast message including the selected system information, wherein the PC5 broadcast message is a sidelink discovery message and the selected system information comprises discovery resource pool information associating sidelink discovery resources with Uu Reference Signals Received Power (RSRP) levels.

15. The candidate relay UE device of claim 14, wherein the selected system information is remote UE cell access information for accessing the cell.

16. The candidate relay UE device of claim 15, wherein:

the selected system information comprises selected Minimum System Information (MSI) that is a portion of MSI transmitted by the cell.

17. The candidate relay UE device of claim 16, wherein:

the selected MSI comprises a selected Master Information Block (MIB) that is a portion of an MIB transmitted by the cell.

18. The candidate relay UE device of claim 15, wherein:

the selected system information comprises a selected System Information Block (SIB) that is a portion of an SIB transmitted by the cell.

19. The candidate relay UE device of claim 18, wherein: the SIB transmitted by the cell is one of SIB1, SIB3, SIB4 and SIB5.

20. The candidate relay UE device of claim 16, wherein the selected system information comprises at least one of Unified Access Control (UAC) configuration, Public Land Mobile Network Identifier (PLMN ID), Tracking Area Code (TAC), Radio Access Network Notification Area Code (RNAC), cell Identifier (cell ID), RRCSetupRequest timer (T300), RRCResumeRequest timer (T319) for first cell.

21. The candidate relay UE device of claim 14, wherein the selected system information comprises neighbor frequency information indicating operating frequencies of neighbor cells in proximity of the cell.

22. The candidate relay UE device of claim 21, wherein the selected system information comprises frequency priority information for cell reselection for the cell.

23. The candidate relay UE device of claim 22, wherein the selected system information comprises a cell frequency of the Uu link to the cell on which the candidate relay UE device is camped.

24. The candidate relay UE device of claim 14, wherein the sidelink discovery message is an initial relay-to-UE discovery transmission of one of a Model A discovery procedure and a Model B discovery procedure between the remote UE device and the candidate relay UE device.

\* \* \* \* \*